United States Patent Office 2,927,036
Patented Mar. 1, 1960

2,927,036

PROTECTIVE COATING COMPOSITIONS

Alton Linwood Seaver III, Weymouth, Mass.

No Drawing. Application April 25, 1957
Serial No. 654,997

7 Claims. (Cl. 106—177)

This invention relates to protective coating compositions suitable for application to metal objects or surfaces to prevent corrosion thereof, and particularly to compositions of the type described which are readily strippable from such surfaces after being applied thereon for extended periods of time.

Synthetic organic compositions having nitrocellulose as the film-forming base have already been prepared for this purpose. However, these nitrocellulose films tend to become brittle and break or fall off the metal surfaces prematurely. The nitrocellulose in the coating also tends to decompose in the presence of sunlight, moisture or heat, causing a yellow discoloration of the film and the release of nitrous acid and other deleterious substances, which tend to attack the metal. Since nitrocellulose also absorbs water readily, films containing it are apt to show a white haze, which tends to prevent or interfere with inspection of the surfaces covered thereby and renders the film generally objectionable in appearance.

It is accordingly a primary object of the present invention to provide coating compositions capable of forming, when dried, tough and relatively impervious films, which are particularly adapted to protect metal articles from rust, tarnish or other corrosive effect, and which are sufficiently flexible to remain in place during periods of storage, display or transport, yet are readily strippable, for example in large pieces, when the metal article is ready for use.

It is a further object of the invention to provide substantially clear, stable coatings or films of the type described which are substantially free of haze and discoloration.

Further objects and advantages of the invention will be apparent from the following description and appended claims.

The above objects can be accomplished in part by employing cellulose acetate butyrate as the film-forming ingredient of the composition. However, the films formed from such compositions are frequently not sufficiently uniform to permit them to be readily stripped or peeled off the surface to which they are applied. It is accordingly an important feature of this invention to incorporate in the coating composition, containing cellulose acetate butyrate as the film-former along with suitable solvents and plasticizers, a small proportion of lecithin, which acts as a binder for the resin particles and produces a uniform film upon drying. When applied to metal surfaces the resulting film can be readily removed in large pieces or sheets, even after long periods of attachment to the metal.

The compositions of the present invention, containing lecithin, can also be baked at high temperatures without bubble formation, whereas prior compositions of this type, but not containing such additives, tend to form bubbles when baked, which subsequently break and expose the metal surfaces. This is particularly important in the case of mechanical parts, such as valves, gears and the like, since it is frequently desirable in such instances to bake the coated parts at temperatures as high as about 350° F. in order to produce tougher and stronger films. While coatings on silverware and other highly polished materials are usually baked at lower temperatures, if at all, even low baking temperatures can cause tarnishing of the metal surfaces and objectionable discoloration of the film. When the lecithin-containing compositions of the invention are employed, however, these problems are substantially avoided.

The coating compositions of the invention in general contain in addition to the cellulose acetate butyrate film-former and the lecithin, a mixture of fast drying solvents, slow drying solvents or diluents, and a suitable plasticizer, or preferably a mixture of plasticizers. Suitable fast drying solvents include such materials as acetone and methyl ethyl ketone. Suitable slow drying solvents or diluents, on the other hand, include toluol, propyl alcohols, butyl alcohols, butyl acetate, an aliphatic hydrocarbon solvent containing a mixture of naphthas, and methyl isobutyl ketone. In general, it is preferable to employ from about 10 to 40% of fast drying solvents, and from about 20 to 70% of slow drying solvents based on the entire composition.

While the solvents named above are exceptionally well suited for the purposes of the invention, with one or two exceptions other compatible solvents may be substituted therefor. For example, ethyl acetate or butyl alcohol can be substitiuted for butyl acetate and for the "Super Troluoil." Likewise, ethyl alcohol, normal propyl alcohol or butyl alcohol can be substituted for the isopropyl alcohol. Methyl isobutyl ketone can be omitted entirely, if desired. The toluol and butyl alcohol, on the other hand, are essential, the toluol acting as a diluent, while the butyl alcohol tends to prevent blushing due to its ability to entrain and thereby remove water in the composition upon being evaporated. Instead of normal butyl alcohol, the secondary or tertiary alcohols, or mixtures of such alcohols may be used with the same effects. Of the fast drying solvents, it is possible to use either the acetone or the methyl ethyl ketone alone, or any desired mixture of the two solvents.

Suitable plasticizers for use in the coating compositions of the invention include, for example, dibutyl phthalate, tricresyl phosphate and an epoxy type resin consisting of epoxidized soybean oil fractions. These, and other similar plasticizers, may be used alone, but it is preferable to use a mixture of the above mentioned materials. In general, the plasticizer material, whether of one kind or a mixture, is added in amounts varying from about 8 to 18% of the entire composition.

Instead of the plasticizers named above, which are preferred, it is also possible to use with good results a variety of other materials, such as for example, dioctyl phthalate, diethyl phthalate, triphenyl phosphate or raw or blown castor oils. Tricresyl phosphate is the most suitable plasticizer, if only one plasticizer is used, but the films can be peeled off more readily and in larger sheets, if the mixture of plasticizers hereinbefore referred to is employed.

The amount of cellulose acetate butyrate employed may be varied from about 10 to 25%, while the amount of lecithin is generally added only in small amounts, varying from 0.2 to 1.5% of the composition, with the optimum amount varying from 0.3 to 0.5%. The film former may be added at any time, but is preferably added at the end to the entire mixture of plasticizers and solvents. It is also preferable to add the lecithin before the plasticizers are added. A most suitable procedure is to add the lecithin to about 15 or 20% of the solvent mixture, stir in, and then add the remainder of the solvent.

The quantities of the various specific solvents used may be varied rather widely. Preferably however, they are employed in the following general proportions:

| | Percent |
|---|---|
| Toluol | 10 to 35 |
| Secondary butyl acetate | 2 to 8 |
| Isopropyl alcohol | 5 to 10 |
| Butyl alcohol | 5 to 15 |
| Mixture of naphthas | 1 to 5 |
| Methyl ethyl ketone | 5 to 20 |
| Acetone | 5 to 20 |
| Methyl isobutyl ketone | 5 to 10 |

When only the essential solvents are employed, the various ingredients are preferably mixed in the following general proportions:

| | Percent |
|---|---|
| Cellulose acetate butyrate | 10 to 25 |
| Plasticizer | 8 to 18 |
| Toluol | 10 to 35 |
| Butyl alcohol | 10 to 20 |
| Acetone (or methyl ethyl ketone) | 10 to 40 |
| Lecithin | 0.2 to 1.5 |

A typical formula in which only the essential solvents are used is as follows:

| | Percent |
|---|---|
| Cellulose acetate butyrate | 15 |
| Tricresyl phosphate | 10 |
| Toluol | 24.7 |
| n-Butyl alcohol | 20 |
| Acetone (or methyl ethyl ketone) | 30 |
| Lecithin | 0.3 |

When a relatively large amount of cellulose acetate butyrate is employed, a composition of the following proportions is suitable:

| | Percent |
|---|---|
| Cellulose acetate butyrate | 25 |
| Dibutyl phthalate | 15 |
| Acetone | 30 |
| Toluol | 14.5 |
| n-Butyl alcohol | 15 |
| Lecithin | 0.5 |

While it is possible to prepare the coating compositions of the invention by mixing the various ingredients in any desired order, good results are obtained by proceeding in accordance with the following example:

A preliminary solvent mixture is first formed by stirring together the following ingredients in the amounts given, the parts being by weight.

| | Parts |
|---|---|
| Toluol | 25 |
| Secondary butyl acetate | 25 |
| Isopropyl alcohol | 20 |
| Mixture of naphthas | 15 |
| Secondary butyl alcohol | 10 |
| Methyl ethyl ketone | 5 |

In this solvent mixture, which is prepared in an amount sufficient to form about 15% by weight of the finished composition, there is then dissolved about 0.3% by weight of soybean lecithin. The following solvent mixture is then prepared and mixed with the preliminary solvent mixture prepared as described above, the percentages given being the percentage by weight of the finished coating composition.

| | Percent |
|---|---|
| Toluol | 30 |
| Acetone | 10 |
| Methyl ethyl ketone | 5 |
| Methyl isobutyl ketone | 5 |
| Normal butyl alcohol | 5 |

To the total mixture of solvents containing lecithin there is then added a mixture of plasticizers having the following composition, in which the percentages are based on the weight of the finished composition.

| | Percent |
|---|---|
| Dibutyl phthalate | 3.8 |
| Epoxidized soybean oil fractions (60% solution in normal butyl acetate) | 3.8 |
| Tricresyl phosphate | 8.4 |

The cellulose acetate butyrate resin is finally stirred into the composition so prepared, sufficient being added to make 14% by weight of the entire mixture. The resulting mixture or solution constitutes the finished composition, which is ready to be applied on the metal surfaces or objects to be coated, as for example by spraying, dipping, brushing or the like. After being dried, or allowed to dry, the composition forms a film which can be readily removed at any time by peeling or otherwise stripping it off, which leaves the coated surfaces in substantially their original condition, free of rusting or other corrosion, even over extended periods of storage or transport.

The lecithin contained in the composition acts as a binder for the resin particles, and aids in the formation of a uniform coating or film which is exceptionally easy to remove. Since the composition is quite clear, the resulting film is sufficiently transparent to permit visual examination of the covered part or surface, or to permit the reading of any lettering or other identifying marks thereon. The film is also sufficiently tough and flexible to protect the metal surfaces from abrasion and rough treatment of the type commonly encountered in transport.

The compositions prepared as herein described can be applied to all kinds of metal articles or materials with substantially equivalent effect, including for example, silverware, steel, tin and copper products, such as valves, gears and the like. The products or objects so coated are thereby effectively protected from corrosion of various types, from tarnishing, and from the effects of sunlight, moisture and all kinds of atmospheric contaminants, such as fumes, dusts and gases.

While the method outlined above for mixing the various ingredients of the composition is most suitable, it is also possible to obtain good results by first mixing the various solvents and then adding the film former, plasticizer and lecithin in any desired order.

The compositions are frequently baked in order to obtain tougher and stronger films. Preferably they are baked at about 350° F. for about 10 minutes. However, they may be baked with good results at temperatures varying from 100° to 350° F. for periods varying from 5 to 30 minutes, depending on the temperature used.

What is claimed is:

1. A protective coating composition consisting essentially of 10 to 25% cellulose acetate butyrate dispersed in organic solvent, said composition also containing from about 8 to 18% of plasticizer and 0.2 to 1.5% of soybean lecithin and forming a substantially clear, stable film upon drying which is readily removable from the surface to which it is applied.

2. The invention substantially as described in claim 1, but further characterized in that the amount of soybean lecithin contained in said composition is between 0.3 and 0.5%.

3. A protective coating composition consisting essentially of 10 to 25% cellulose acetate butyrate as the film former, said butyrate being dispersed in a solvent mixture consisting essentially of from 10 to 40% of fast drying solvents and from 20 to 70% of slow drying solvents based on the entire composition, said composition also containing from 8 to 18% of a plasticizer and from 0.2 to 1.5% of soybean lecithin and forming a film upon drying which is readily strippable from the surface to which it is applied.

4. The invention substantially as described in claim 3, but further characterized in that said fast drying solvents are selected from the group consisting of acetone, methyl ethyl ketone and mixtures thereof, and said slow drying solvents include toluol and butyl alcohol.

5. A protective coating composition consisting essentially of 10 to 25% cellulose acetate butyrate dissolved in a solvent mixture consisting essentially of 10 to 35% toluol, 2 to 8% secondary butyl acetate, 5 to 10% isopropyl alcohol, 5 to 15% butyl alcohol, 1 to 5% naphtha, 5 to 20% methyl ethyl ketone, 5 to 20% acetone, and 5 to 10% methyl isobutyl ketone, said composition also containing about 8 to 18% of plasticizer material and 0.2 to 1.5% of soybean lecithin, said composition forming a substantially clear, stable film upon drying which is readily strippable from the surface to which it is applied.

6. A protective coating composition consisting essentially of from 10 to 25% cellulose acetate butyrate, from 8 to 18% of plasticizer, from 10 to 35% toluol, from 10 to 20% butyl alcohol, from 10 to 40% of fast drying solvent selected from the group consisting of acetone, methyl ethyl ketone and mixtures thereof, and from 0.2 to 1.5% of soybean lecithin, said composition forming a substantially clear, stable film upon drying which is readily strippable from the surface to which it is applied.

7. A protective coating composition comprising 15% cellulose acetate butyrate, 10% plasticizing material, 30% of fast drying solvent selected from the group consisting of acetone, methyl ethyl ketone and mixtures thereof, 24.7% toluol, 20% butyl alcohol and 0.3% of soybean lecithin, said composition forming a substantially clear, stable film upon drying which is readily strippable from the surface to which it is applied.

References Cited in the file of this patent

UNITED STATES PATENTS

| | | |
|---|---|---|
| 2,201,064 | Thurman | May 14, 1940 |
| 2,561,361 | Gray | July 24, 1951 |

OTHER REFERENCES

Fordyce et al.: Industrial and Engineering Chemistry, vol. 28, No. 11, November 1936, pages 1310–1313.